United States Patent
Sekizawa et al.

(10) Patent No.: US 10,086,835 B2
(45) Date of Patent: Oct. 2, 2018

(54) LANE KEEPING CONTROL SYSTEM

(71) Applicants: DENSO CORPORATION, Kariya, Aichi-pref. (JP); NIPPON SOKEN, INC., Nishio, Aichi-pref. (JP)

(72) Inventors: Takatoshi Sekizawa, Kariya (JP); Youichirou Suzuki, Nishio (JP); Masashi Mori, Kariya (JP); Akira Takaoka, Nishio (JP)

(73) Assignees: DENSO CORPORATION, Kariya, Aichi-pref. (JP); SOKEN INC, Nisshin, Aichi-pref (JP)

( * ) Notice: Subject to any disclaimer, the term of this patent is extended or adjusted under 35 U.S.C. 154(b) by 6 days.

(21) Appl. No.: 15/516,267

(22) PCT Filed: Nov. 2, 2015

(86) PCT No.: PCT/JP2015/005502
§ 371 (c)(1),
(2) Date: Mar. 31, 2017

(87) PCT Pub. No.: WO2016/075893
PCT Pub. Date: May 19, 2016

(65) Prior Publication Data
US 2017/0305421 A1    Oct. 26, 2017

(30) Foreign Application Priority Data
Nov. 10, 2014 (JP) .................................. 2014-228175

(51) Int. Cl.
*B60W 30/12* (2006.01)
*B60W 10/20* (2006.01)
(Continued)

(52) U.S. Cl.
CPC ............ *B60W 30/12* (2013.01); *B60W 10/18* (2013.01); *B60W 10/20* (2013.01); *B60C 19/00* (2013.01);
(Continued)

(58) Field of Classification Search
CPC .. B60C 19/00; B60C 2019/004; B60W 10/18; B60W 10/20; B60W 2420/42;
(Continued)

(56) References Cited

U.S. PATENT DOCUMENTS 6,202,011 B1 * 3/2001 Jeon ..................... B60G 17/015
280/5.515
6,264,292 B1 * 7/2001 Umeno ................... B60T 8/172
303/163

(Continued)

FOREIGN PATENT DOCUMENTS

JP    2003011756 A    1/2003
JP    2007055284 A    3/2007
(Continued)

*Primary Examiner* — Tyler J Lee
(74) *Attorney, Agent, or Firm* — Harness, Dickey & Pierce, P.L.C.

(57) ABSTRACT

A road-surface-condition estimation device is configured by a tire-side device and a vehicle-side device so as to grasp a road surface condition based on road surface condition data transmitted from a tire-side device. As a result, the road surface condition or a road surface μ of a traveling road surface of a vehicle can be accurately detected, and a more accurate lane keeping control can be performed according to the detection result. In particular, since the tire-side device estimates the road surface condition by detecting the vibration of a ground contact surface of the tire, the road surface condition can be estimated more accurately. Therefore, the more accurate lane keeping control can be performed.

6 Claims, 5 Drawing Sheets

(51) Int. Cl.
*B60W 10/18* (2012.01)
*B60C 19/00* (2006.01)
*B60W 50/14* (2012.01)

(52) U.S. Cl.
CPC ........ *B60C 2019/004* (2013.01); *B60W 50/14* (2013.01); *B60W 2420/42* (2013.01); *B60W 2550/12* (2013.01); *B60W 2550/147* (2013.01); *B60W 2550/148* (2013.01); *B60W 2710/18* (2013.01); *B60W 2710/20* (2013.01)

(58) Field of Classification Search
CPC ....... B60W 2550/12; B60W 2550/147; B60W 2550/148; B60W 2710/18; B60W 2710/20; B60W 30/12; B60W 50/14
See application file for complete search history.

(56) References Cited

U.S. PATENT DOCUMENTS

| | | | | |
|---|---|---|---|---|
| 7,203,579 B2* | 4/2007 | Yokota | ................ | B60C 23/0477 303/150 |
| 7,577,532 B2* | 8/2009 | Ichikawa | ................ | B60C 11/24 702/34 |
| 7,957,879 B2* | 6/2011 | Kitazaki | ................ | B60T 8/172 152/151 |
| 8,122,762 B2* | 2/2012 | Wakao | ................ | B60C 11/0318 73/146 |
| 8,255,118 B2* | 8/2012 | Bujak | ................ | B60G 17/0165 303/152 |
| 8,437,907 B2* | 5/2013 | Bian | ................ | B60T 8/172 180/167 |
| 2002/0162389 A1* | 11/2002 | Yokota | ................ | B60C 23/06 73/146 |
| 2004/0093128 A1* | 5/2004 | Kin | ................ | G01P 3/66 701/1 |
| 2004/0260436 A1* | 12/2004 | Kin | ................ | B60C 23/061 340/442 |
| 2005/0085987 A1* | 4/2005 | Yokota | ................ | B60C 23/0477 701/80 |
| 2005/0119820 A1* | 6/2005 | Sawada | ................ | B60W 10/06 701/111 |
| 2008/0249689 A1* | 10/2008 | Matsumoto | ............. | B60T 8/173 701/48 |
| 2008/0249690 A1* | 10/2008 | Matsumoto | ........... | B60W 10/06 701/48 |
| 2010/0138108 A1* | 6/2010 | Kajino | ................ | B60G 17/016 701/38 |
| 2015/0046033 A1* | 2/2015 | Yoshimi | ............... | B60G 17/015 701/37 |
| 2016/0368502 A1 | 12/2016 | Suzuki et al. | | |

FOREIGN PATENT DOCUMENTS

| | | |
|---|---|---|
| JP | 2009046091 A | 3/2009 |
| JP | 2015174638 A | 10/2015 |

* cited by examiner

GROUND CONTACT PORTION
(GROUND CONTACT LENGTH)

LANE KEEPING CONTROL SYSTEM

CROSS-REFERENCE TO RELATED APPLICATIONS

This application is a U.S. National Phase Application under 35 U.S.C. 371 of International Application No. PCT/JP2015/005502 filed on Nov. 2, 2015 and Published in Japanese as WO 2016/075893 A1 on May 19, 2016. This application is based on and claims the benefit of priority from Japanese Patent Application No. 2014-228175 filed on Nov. 10, 2014. The entire disclosures of all of the above applications are incorporated herein by reference.

TECHNICAL FIELD

The present disclosure relates to a lane keeping control system that performs a lane keeping control for suppressing a deviation of a vehicle from a traveling lane.

BACKGROUND ART

Up to now, a lane keeping control for suppressing a deviation of a vehicle from a traveling lane is performed in a vehicle (for example, refer to Patent Literature 1). In the lane keeping control, an image ahead of the vehicle in a traveling direction is captured by an on-board camera to recognize a lane line or the like drawn along the traveling lane. When the vehicle attempts to cross the lane line, attention is paid to the driver by a warning or the like, and the vehicle is restrained from deviating from the traveling lane. Furthermore, in the lane keeping control, with the execution of the brake control and the steering control, a vehicle motion control for generating a moment in a direction of returning the vehicle in the traveling lane is performed while suppressing the deviation of the vehicle from the traveling lane, to thereby support the driver. The control improves the safety of the vehicle travel.

When the lane keeping control is executed, a design assuming a specific road surface condition or a road surface friction coefficient (hereinafter referred to as "road surface $\mu$"), for example, a design on the assumption of a smooth road surface such as a dry road surface and an asphalt road surface is carried out. Originally, it is conceivable to preferably detect a road surface condition of the current traveling road surface of the vehicle and the road surface $\mu$ and execute the lane keeping control based on the detection result. However, because the road surface condition and the road surface $\mu$ cannot be accurately detected, the design is carried out on the assumption of a specific road surface condition or a road surface $\mu$.

PRIOR ART LITERATURES

Patent Literature

Patent Literature 1: JP 2003-11756 A

SUMMARY OF INVENTION

It is an object of the present disclosure to provide a lane keeping control system capable of accurately detecting a road surface condition or a road surface $\mu$ of a traveling road surface of a vehicle and performing a more accurate lane keeping control according to the detection result.

According to one aspect of the present disclosure, a lane keeping control system includes a tire-side device including a vibration detection unit that is attached to a rear surface of a tread of a tire provided on a wheel in a vehicle and outputs a detection signal corresponding to a magnitude of vibration of the tire, a signal processing unit that performs signal processing on the detection signal of the vibration detection unit to generate road surface condition data that is data indicative of a road surface condition of a traveling road surface of the tire, and a transmitter that transmits the road surface condition data. In addition, the lane keeping control system includes: a road-surface-condition estimation device provided with a vehicle-side device including a receiver that receives the road surface condition data transmitted from the transmitter; an information processing unit that recognizes the road surface condition of the traveling road surface of each wheel from the road surface condition data and generates data indicative of the recognition result, and an output unit that outputs the data generated by a second signal processing unit. Furthermore, the lane keeping control system is provided with a lane keeping control device for executing the lane keeping control that restrains the vehicle from deviating from the traveling lane based on the road surface condition estimated by the road-surface-condition estimation device.

As described above, the road-surface-condition estimation device is configured by the tire-side device and the vehicle-side device so as to grasp the road surface condition based on the road surface condition data transmitted from the tire-side device. Therefore, the road surface condition or the road surface $\mu$ of the traveling road surface of the vehicle can be accurately detected, and a more accurate lane keeping control can be performed according to the detection result.

In particular, since the tire-side device detects the vibration of the ground contact surface of the tire, the tire-side device estimates the road surface condition based on the detected vibration, thereby being capable of estimating the road surface condition more accurately. Therefore, the more accurate lane keeping control can be performed.

BRIEF DESCRIPTION OF DRAWINGS

The object and another objects, features, and advantages of the present disclosure will be more clarified on the basis of the following detailed descriptions with reference to the accompanying drawings.

DETAILED DESCRIPTION

Hereinafter, embodiments of the present disclosure will be described below with reference to the drawings. In the following respective embodiments, parts identical with or equivalent to each other are denoted by the same symbols for description.

First Embodiment

A first embodiment of the present disclosure will be described. A lane keeping control system according to the present embodiment will be described with reference to FIGS. 1 to 6.

Figure 1:
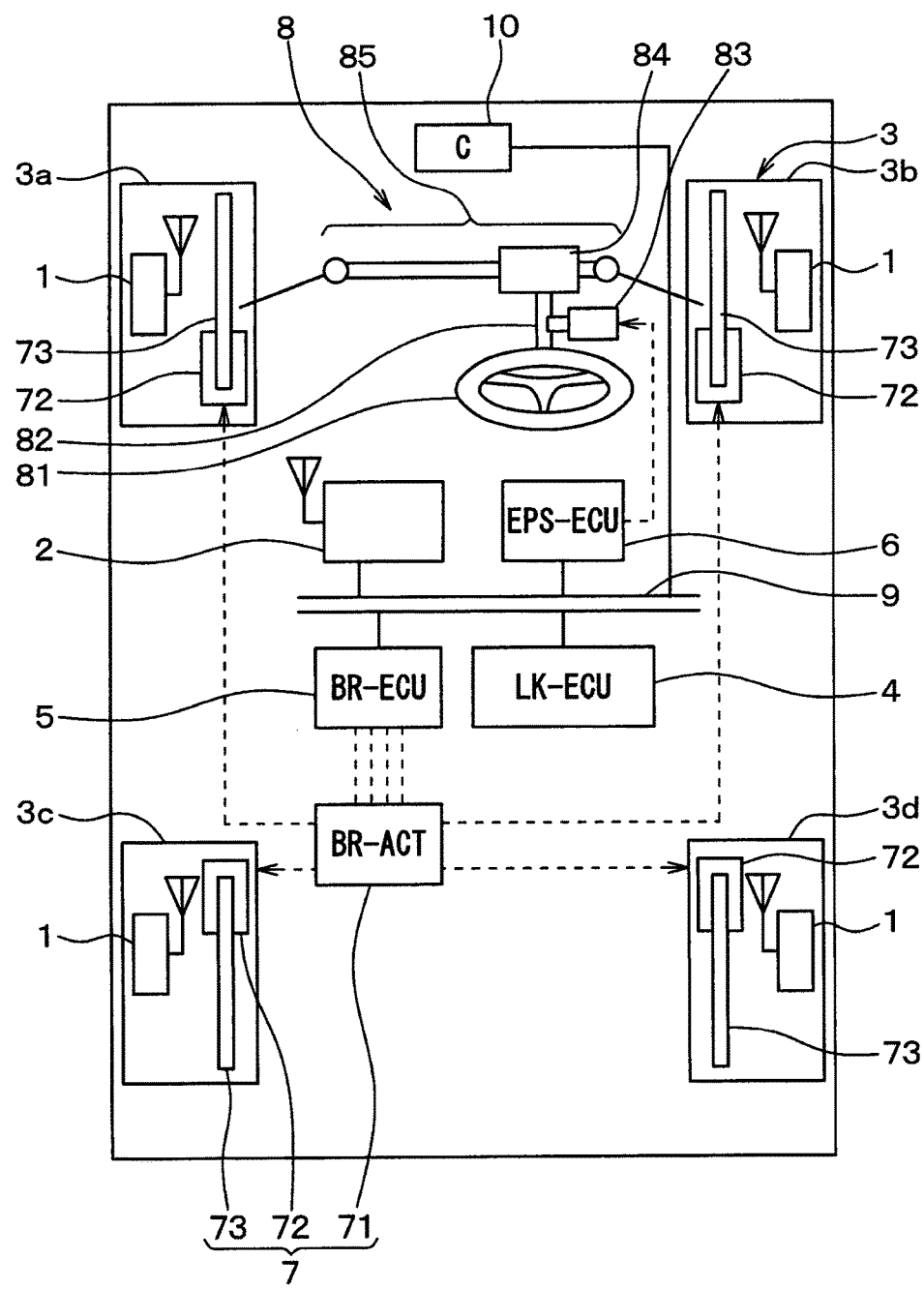
FIG. 1 is a diagram illustrating a schematic configuration of a lane keeping control system according to a first embodiment of the present disclosure.

As illustrated in FIG. 1, a lane keeping control system includes various electronic control units (hereinafter referred to as "ECUs") 4 to 6, a brake control mechanism 7, and a steering control mechanism 8 in addition to a tire-side device 1 and a vehicle-side device 2 configuring a road-surface-condition estimation device.

The road-surface-condition estimation device configured by the tire-side device 1 and the vehicle-side device 2 is used to estimate a road surface condition during traveling based on vibration on a ground contact surface of a tire provided for each wheel of the vehicle. Specifically, the road-surface-condition estimation device transmits data representing the road surface condition during traveling from the tire-side device 1, and the vehicle-side device 2 receives the data transmitted from the tire-side device 1 and estimates the road surface condition during traveling based on the received data. In the present embodiment, the tire-side device 1 and the vehicle-side device 2 are configured as follows.

Figure 2:
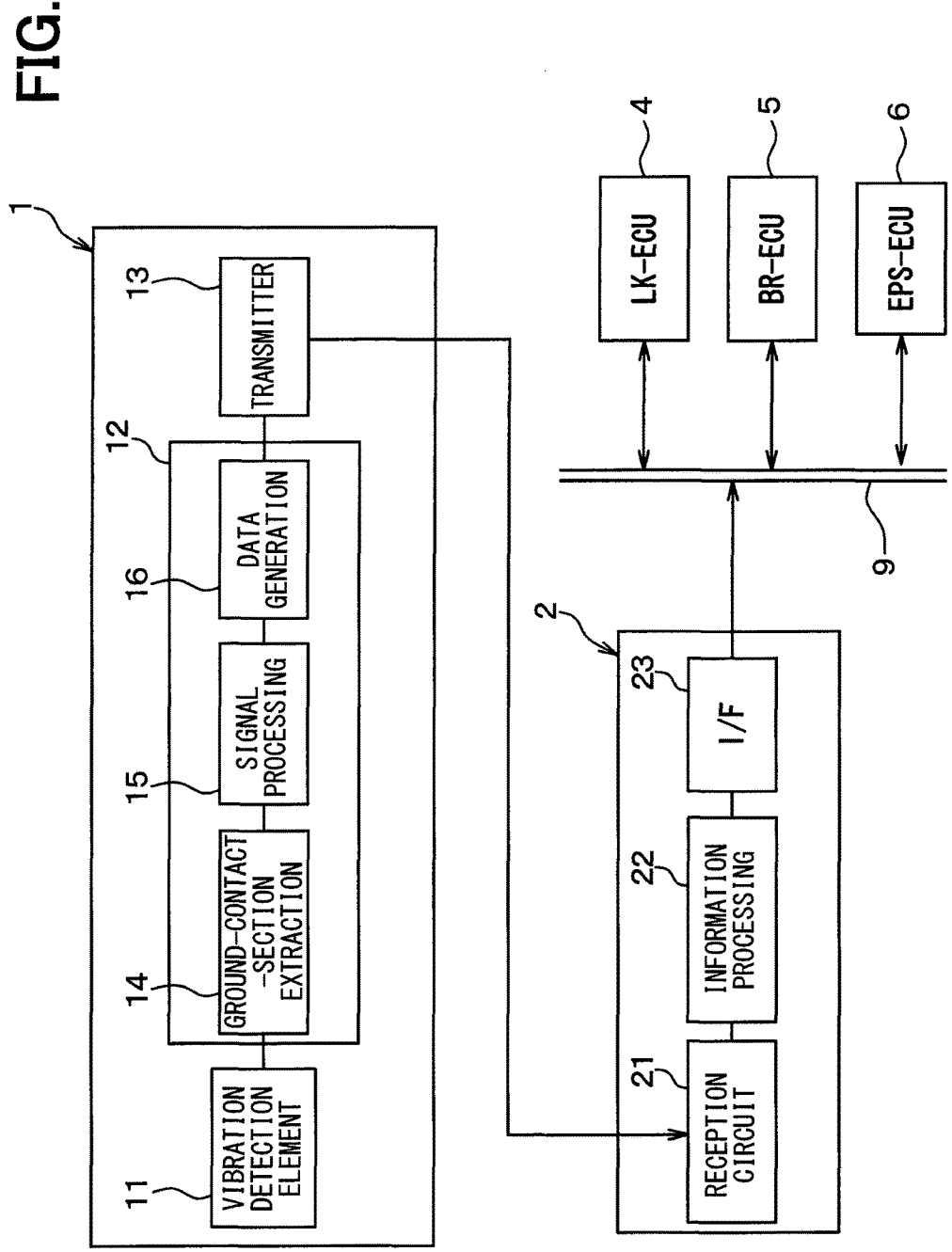
FIG. 2 is a block diagram illustrating details of a tire-side device 1 and a vehicle-side device 2 configuring a road-surface-condition estimation device in the lane keeping control system.
Figure 3:
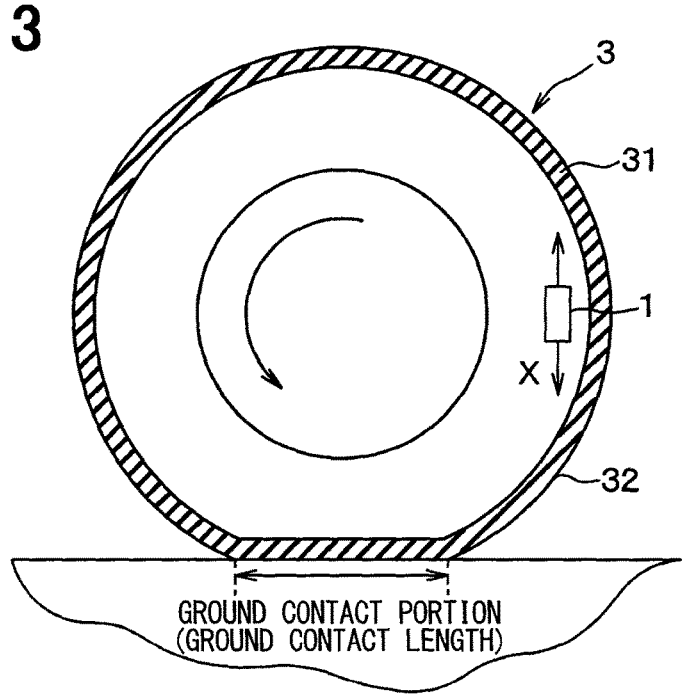
FIG. 3 is a schematic cross-sectional view of a tire 31 to which the tire-side device 1 is fixed.

As illustrated in FIG. 2, the tire-side device 1 is provided with a vibration detection element 11, a signal processing circuit unit 12, and a transmitter 13. As illustrated in FIG. 3, the tire-side device 1 is installed on a back side of a tread 32 of each tire 31 provided on each wheel 3 (3a to 3d).

The vibration detection element 11 configures a vibration detection unit that outputs a detection signal corresponding to the vibration in a direction coming in contact with a circular orbit drawn by the tire-side device 1 when each tire 31 rotates, that is, in a tire tangential direction (a direction of an arrow X in FIG. 3). In the present embodiment, the vibration detection element 11 outputs the detection signal corresponding to the vibration in the tire tangential direction. As the vibration detection element 11, for example, an acceleration sensor or the like can be used.

Further, the vibration detection element 11 can convert a vibration energy into an electric energy, and a power supply of the tire-side device 1 can be generated based on the converted energy. In that case, the vibration detection element 11 is disposed so as to generate a power according to the vibration in the tire tangential direction. Such a vibration detection element 11 can be configured by, for example, an electrostatic induction power generation element (electret), a piezoelectric element, a friction type, a magnetostrictive type, and an electromagnetic induction type element.

More specifically, when the vehicle having the road-surface-condition estimation device travels, the tread 32 of each tire 31 vibrates due to various factors such as a rotational movement of the tire 31 and unevenness of a road surface. Since the vibration is transmitted to the vibration detection element 11 to change an output signal of the vibration detection element 11 according to the magnitude of the vibration, the output signal of the vibration detection element 11 is transmitted to the signal processing circuit unit 12 as a detection signal indicative of the magnitude of the vibration in the tire tangential direction.

The signal processing circuit unit 12 uses the output voltage of the vibration detection element 11 as the detection signal indicative of vibration data in the tire tangential direction, processes the detection signal to obtain data indicative of the road surface condition, and transmits the obtained data to the transmitter 13. In other words, the signal processing circuit unit 12 extracts a ground contact section (that is, a section in which a portion corresponding to a placement position of the vibration detection element 11 in the tread 32 of the tire 31 contacts the road surface) of the vibration detection element 11 during the rotation of the tires 31 on the basis of a temporal change in the output voltage of the vibration detection element 11. Since a high frequency component included in the detection signal in the ground contact section of the vibration detection element 11 represents the road surface condition, the signal processing circuit unit 12 extracts the high frequency component, and also generates data indicative of the road surface condition on the basis of the extracted high frequency component, and transmits the generated data to the transmitter 13.

More specifically, the signal processing circuit unit 12 is configured by a well-known microcomputer having various circuits, a CPU, a ROM, a RAM, an I/O, and so on, and performs the above processing on the basis of the output voltage of the vibration detection element 11. The signal processing circuit unit 12 includes, as portions for performing those processing, a ground-contact-section extraction unit 14, a signal processing unit 15, and a data generation unit 16.

The ground-contact-section extraction unit 14 detects a peak value of the detection signal represented by the output voltage of the vibration detection element 11, extracts the ground contact section of the vibration detection element 11, and transmits a fact that the vibration detection element 11 is in the ground contact section to the signal processing unit 15. The ground-contact-section extraction unit 14 causes the transmitter 13 to generate a transmission trigger for transmitting a calculation result of the signal processing unit 15 to the vehicle-side device 2 as road surface condition data indicative of the road surface condition. Hereinafter, a function of the ground-contact-section extraction unit 14 will be described in detail.

Figure 4:
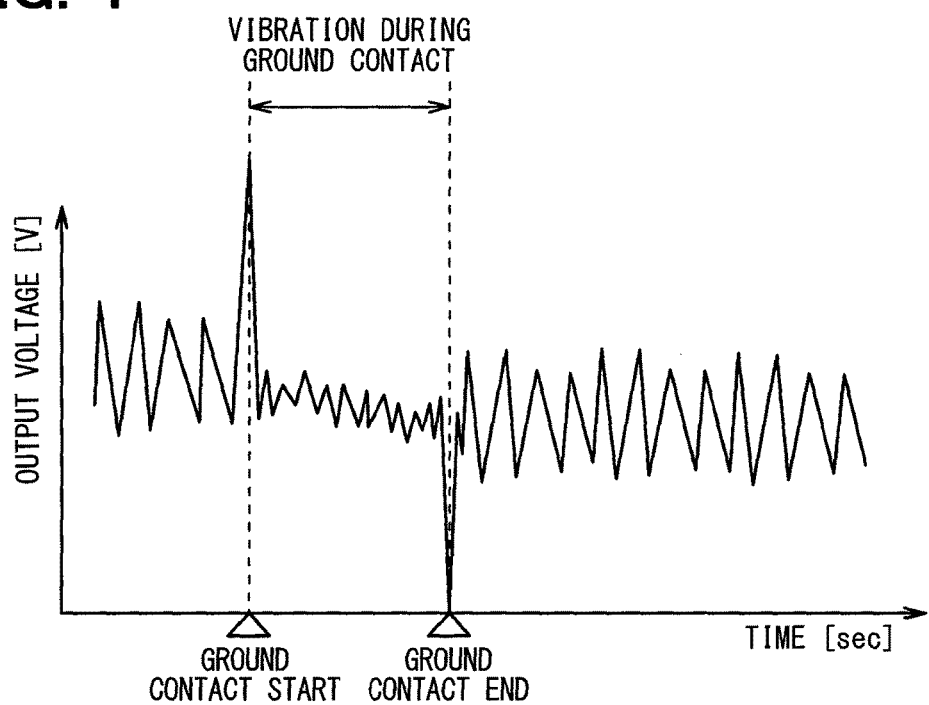
FIG. 4 is an output voltage waveform diagram of a vibration detection element 11 during tire rotation.

An output voltage waveform of the vibration detection element 11 during the tire rotation is, for example, illustrated in FIG. 4. As illustrated in FIG. 4, at a ground contact start time when a portion of the tread 32 corresponding to the placement position of the vibration detection element 11 starts to contact the ground with the rotation of the tires 31, the output voltage of the vibration detection element 11 reaches a maximum value. In the ground-contact-section extraction unit 14, a timing of a first peak value when the output voltage of the vibration detection element 11 becomes the maximum value is detected as the ground contact start time. Further, as illustrated in FIG. 3, at a ground contact end time when changing from a state in which the portion of the tread 32 corresponding to the placement position of the vibration detection element 11 contacts the ground to a state in which the portion no longer contacts the ground with the rotation of the tire 31, the output voltage of the vibration detection element 11 reaches a minimum value. In the ground-contact-section extraction unit 14, a timing of a second peak value when the output voltage of the vibration detection element 11 becomes the minimum value is detected as the ground contact end time.

The reason why the vibration detection element 11 reaches the peak values at the timings described above will be described below. In other words, when the portion of the tread 32 corresponding to the placement position of the vibration detection element 11 contacts the ground with the rotation of each tire 31, a portion of the tire 31 which has been shaped into substantially a cylindrical surface till that time in the vicinity of the vibration detection element 11 is pressed, and deformed into a planar shape. Upon receiving an impact at the time of the deformation, the output voltage of the vibration detection element 11 reaches the first peak value. When the portion of the tread 32 corresponding to the placement position of the vibration detection element 11 is separated from the ground contact surface with the rotation of the tire 31, the tire 31 is released from pressing and returned to the substantially cylindrical shape from the planar shape in the vicinity of the vibration detection element 11. Upon receiving an impact when returning the shape of the tire 31 to the original, the output voltage of the vibration detection element 11 becomes the second peak value. As described above, the first and second peak values are reached when the vibration detection element 11 starts to contact the ground and ends to contact the ground, respectively. Because a direction of the impact when the tire 31 is pressed is opposite to a direction of the impact when the tire 3 is released from being pressed, signs of the output voltage are also opposite to each other.

The ground-contact-section extraction unit 14 transmits the timings of the first and second peak values to the signal processing unit 15, and issues an instruction for rectifying and integrating the high frequency component included in the output voltage of the vibration detection element 11 in a period from the timing of the first peak value to the timing of the second peak value. As described above, the ground-contact-section extraction unit 14 extracts the ground contact section of the vibration detection element 11, and transmits a fact that the vibration detection element 11 is in the ground contact section to the signal processing unit 15.

Because the timing when the output voltage of the vibration detection element 11 becomes the second peak value is set to the ground end time of the vibration detection element 11, the ground-contact-section extraction unit 14 transmits a transmission trigger to the transmitter 13 at that timing. As a result, the transmitter 13 transmits the road surface condition data created by the signal processing unit 15. As described above, because the data transmission by the transmitter 13 is not always performed, but is performed exclusively at the ground contact end time of the vibration detection element 11, the power consumption can be reduced.

Upon receiving the fact that vibration detection element 11 is in the ground contact section from the ground-contact-section extraction unit 14, the signal processing unit 15 creates the road surface condition data based on the high frequency component caused by the vibration of the tire 31 included in the output voltage of the vibration detection element 11 during that period.

Figure 5:
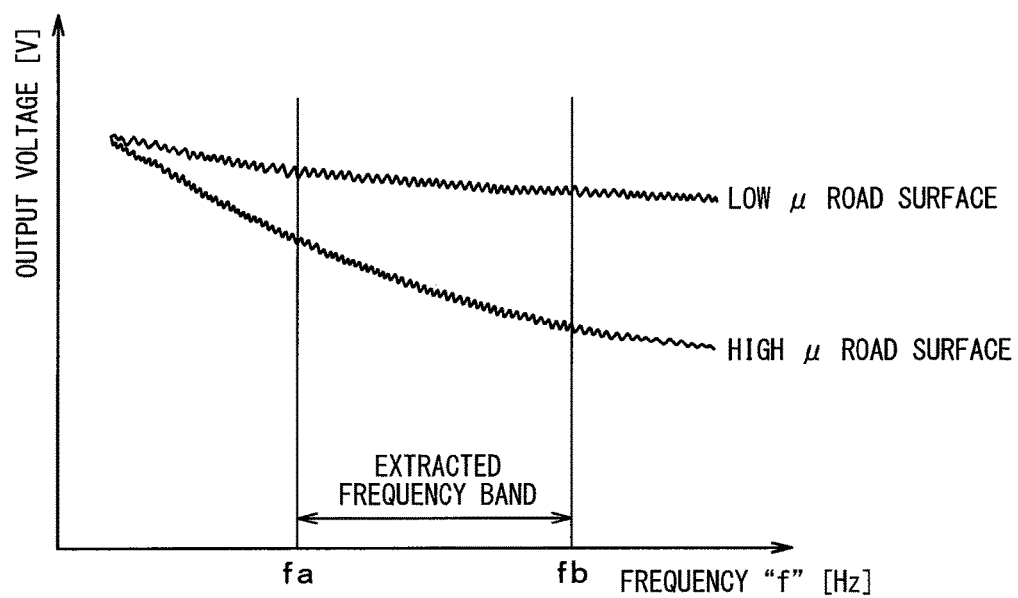
FIG. 5 is a diagram illustrating a difference in results of frequency analysis of an output voltage between a low $\mu$ road surface and a high $\mu$ road surface.

Specifically, when the output voltage of the vibration detection element 11 is subjected to frequency analysis (for example, Fourier transformation) on a high $\mu$ road surface having a road surface $\mu$ higher than the reference value and on a low $\mu$ road surface having a road surface $\mu$ lower than the reference value, the result illustrated in FIG. 5 is obtained. In other words, when the vehicle is traveling on the low $\mu$ road surface due to an influence of the road surface $\mu$, fine high frequency vibration due to slipping of the tire 31 is superimposed on the output voltage. As a result, the low $\mu$ road surface becomes higher in the high frequency component contained in the output voltage than the high $\mu$ road surface.

Based on the above fact, the high frequency components of the frequency bands "fa" to "fb" assumed to change according to the road surface condition and the road surface $\mu$ are extracted by filtering or the like, and the voltage of the high frequency component of the frequency bands "fa" to "fb" taken out by frequency analysis is integrated. For example, a capacitor not shown is charged. With the above configuration, the amount of charge in the case where the traveling road surface is the low $\mu$ road surface is larger than that in the case where the traveling road surface is the high $\mu$ road surface. It can be determined whether the road surface $\mu$ is a high $\mu$ road surface higher than a predetermined reference value, or a low $\mu$ road surface lower than the reference value, on the basis of the amount of charge. In addition, a voltage level of the high frequency component is varied depending on the road surface condition such as a smooth road surface or a gravel road. Therefore, the road surface situation and the road surface condition of the road surface $\mu$ are determined according to an integration result of the voltage of the high frequency component.

For example, it is determined that the traveling road surface is the low $\mu$ road surface if the integrated voltage value is larger than a determination threshold determined on the basis of the reference value, and the traveling road surface is the high $\mu$ road surface if the integrated road surface value is smaller. The determination threshold is set as a reference value when the road surface $\mu$ is within a predetermined range, and an upper limit value of a range of the integrated voltage value assumed at the reference value is set as a threshold on the low $\mu$ road surface side, and a lower limit value of the range is set as a threshold of the high $\mu$ road surface side. With comparing the upper limit value or the lower limit value of the range of the integrated voltage assumed at the reference value to the calculated integrated voltage value, the road surface condition of the traveling road surface can be estimated.

Then, the signal processing unit 15 generates the determination result obtained in the manner described above as the road surface condition data, and the road surface condition data is transmitted from the signal processing unit 15 to the transmitter 13.

The transmitter 13 transmits the road surface condition data transmitted from the data generation unit 16 to the vehicle-side device 2. A communication between the transmitter 13 and a receiver 21 provided in the vehicle-side device 2 can be implemented by a known short-distance wireless communication technology such as Bluetooth (registered trademark). Timing at which the road surface condition data is transmitted is arbitrary, but as described above, in the present embodiment, the transmission trigger is transmitted from the ground-contact-section extraction unit 14 at the ground contact end time of the vibration detection element 11 to transmit the road surface condition data from the transmitter 13. As described above, because the data transmission by the transmitter 13 is not always performed, but is performed exclusively at the ground contact end time of the vibration detection element 11, the power consumption can be reduced.

The road surface condition data is transmitted together with unique identification information (hereinafter referred to as "ID information") on the wheel 3 (3a to 3d) provided for each of the tires 31 equipped in the vehicle in advance. Since a position of each wheel 3 can be identified by a known wheel position detection device for detecting any position of the vehicle to which the wheel 3 is attached, the road surface condition data is transmitted to the vehicle-side device 2 together with the ID information, thereby being capable of discriminating which wheel 3 the data is related to. Normally, it is assumed that the road surface $\mu$ of the traveling road surface is uniform. However, there is a μ split road different in the road surface μ between right and left wheels of the vehicle, and in such a μ split road, the road surface condition data is preferably transmitted for each wheel 3. In the present embodiment, the road surface condition data is transmitted for each wheel 3 as described above.

On the other hand, the vehicle-side device 2 includes a receiver 21, an information processing unit 22, and an interface (hereinafter referred to as "I/F") 23. The vehicle-side device 2 receives the road surface condition data transmitted from the tire-side device 1 and performs various processes based on the received data, thereby detecting the road surface condition during traveling, that is, the road surface condition and the road surface μ.

The receiver 21 receives data including the road surface condition data and ID information transmitted by the tire-side device 1. The data received by the receiver 21 is sequentially output to the information processing unit 22 every time receiving the data.

The information processing unit 22 includes a known microcomputer having a CPU, a ROM, a RAM, and an I/O, and processes the various information included in the data according to programs stored in the ROM and so on. More specifically, the information processing unit 22 recognizes the road surface condition based on the road surface condition data and the ID information included in a data IGBT, generates data indicating the road surface condition, and transmits the data to the I/F 23 according to a predetermined communication protocol. In the present embodiment, as described above, since the road surface condition data is transmitted for each wheel 3, the road condition and the road surface μ are recognized for each position of each wheel 3, and the data representing the recognition result is transmitted to the I/F 23.

The I/F 23 corresponds to an output unit that places the road surface condition recognized by the information processing unit 22 on an in-vehicle LAN 9 used for, for example, a CAN (Controller Area Network) communication which is a vehicle network, and data related to the road surface condition is transmitted to the various ECUs 4 to 6 through the vehicle LAN 9. With the above configuration, the road-surface-condition estimation device in the lane keeping control system according to the present embodiment is configured.

In addition, the lane keeping control system includes a lane keeping ECU 4, a brake ECU 5, and an electric power steering (hereinafter referred to as EPS (electric power steering)) ECU 6 as various ECUs 4 to 6.

The lane keeping ECU 4 configures the lane keeping control device according to the present disclosure. The lane keeping ECU 4 is configured by a well-known microcomputer having a CPU, a ROM, a RAM, an I/O and the like. When an execution switch of the lane keeping control not shown is pushed down, the lane keeping ECU 4 executes a lane keeping control according to the programs stored in the ROM. Specifically, the lane keeping ECU 4 acquires data on the road surface condition through the in-vehicle LAN 9 and executes the lane keeping control based on the acquired data on the road surface condition. In the lane keeping control, a warning is given to a driver, or a brake control and a steering control are performed in order to restrain the vehicle from deviating from traveling lane based on the imaging data of the on-board camera 10. Details of the lane keeping control will be described later.

The brake ECU 5 includes a well-known microcomputer including a CPU, a ROM, a RAM, an I/O, and the like and corresponds to a brake control device that executes brake control according to a program stored in the ROM or the like. In addition to the brake control based on brake pedal operation of the driver, the brake ECU 5 also performs a brake control corresponding to a braking request based on the lane keeping control. Specifically, the brake ECU 5 outputs a control signal to a brake actuator 71 provided in a brake control mechanism 7 in response to the braking request, and generates a desired braking force for the desired wheel 3.

For example, the brake actuator 71 is provided with various electromagnetic valves, pumps, pump driving motors, and so on, controls the electromagnetic valves to adjust the brake hydraulic circuit, and operates each motor to drive each pump, to thereby generate a wheel cylinder pressure. With the wheel cylinder pressure, a desired braking force can be generated for a desired wheel 3. In other words, the brake ECU 5 performs various calculations according to the braking request, and controls the electromagnetic valve provided in the brake actuator 71 and the pump driving motor according to the calculation result. As a result, the wheel cylinder pressure is generated, and a brake pad provided in a caliper 72 is pressed against a brake disc 73, to thereby generate a desired braking force. At that time, since the brake hydraulic circuit can be adjusted based on the control of the electromagnetic valve of the brake actuator 71, only the wheel cylinder pressure of the desired wheel 3 is generated or the wheel cylinder pressure is adjusted for each wheel 3. Therefore, a desired braking force can be generated for the desired wheel 3.

The EPS-ECU 6 is configured by a well-known microcomputer including a CPU, a ROM, a RAM, an I/O and the like, and corresponds to a steering control device that executes the steering control according to a program stored in the ROM or the like. In addition to the steering control based on the driver's steering operation, the EPS-ECU 6 performs the steering control according to a steering control request based on the lane keeping control. More specifically, the EPS-ECU 6 outputs a control signal to the steering control mechanism 8 in response to the steering control request, and adjusts a steering angle so as to generate a desired steering angle with respect to the desired wheel 3.

For example, the EPS-ECU 6 performs various calculations according to the steering control request, and controls the steering control mechanism 8. The steering control mechanism 8 includes a steering 81, a steering shaft 82, a motor 83, a steering gear mechanism 84, a steering link mechanism 85 and the like, and adjusts an angle (steering angle) with respect to a center line of both front wheels, which are steering wheels. In the EPS, the steering 81 is operated by the driver so that the steering shaft 82 is rotated through, for example, a steering column not shown. The torque generated on the steering shaft 82 can also be generated by an assist force based on the drive of the motor 83. In the steering control, the torque generated on the steering shaft 82 is controlled by controlling the motor 83. The torque generated on the steering shaft 82 is transmitted to the steering gear mechanism 84 as a handle shaft torque. With the above steering gear mechanism 84, the handle shaft torque as the force in the rotational direction is converted into a force in the direction perpendicular to the steering shaft 82 according to the combination of the built-in gears, for example, the engagement of a rack-and-pinion type gear. The converted force is transmitted to left and right front wheels 3*a* and 3*b* which are steering wheels through the steering link mechanism 85, and the left and right front wheels 3a and 3b are oriented in the same direction so as to generate a desired steering angle.

Figure 6:
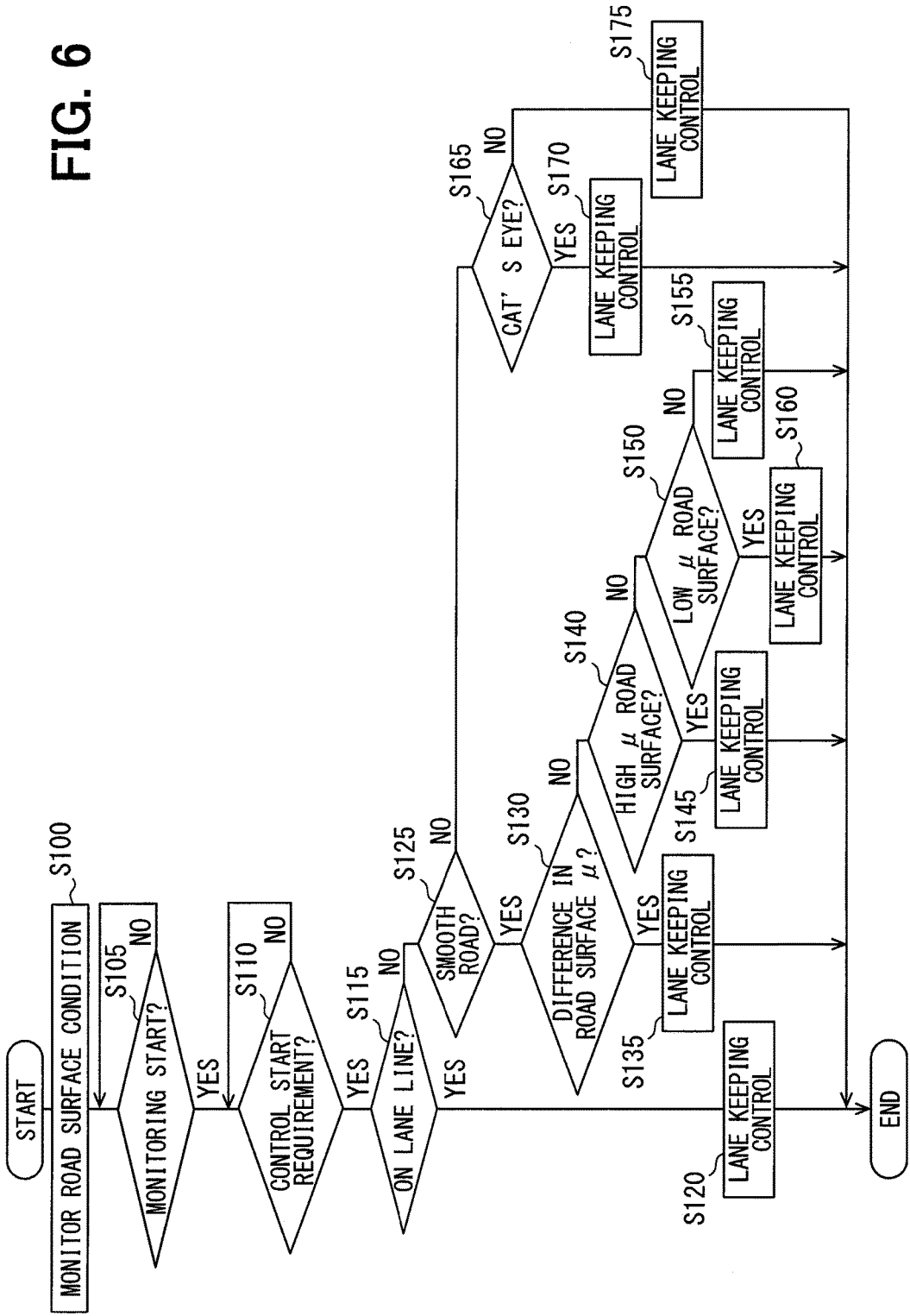
FIG. 6 is a flowchart illustrating details of the lane keeping control process.

With the above-described configuration, the lane keeping control system according to the present embodiment is configured. Next, the operation of the lane keeping control system thus configured will be described with reference to a flowchart of the lane keeping control process to be executed by the lane keeping ECU 4 illustrated in FIG. 6. Note that the lane keeping control process illustrated in FIG. 6 is executed at predetermined control cycles, for example, when an ignition switch not shown is turned on.

First, in Step 100, the result of the detection of the road surface condition by the use of the road-surface-condition estimation device, that is, the tire-side device 1 and the vehicle-side device 2 is acquired to monitor the road surface conditions such as the road surface μ of the traveling road surface and the road surface condition of the flat road or the gravel road. Then, the process proceeds to Step 105, where it is determined whether the condition for a monitoring start by the lane keeping control has been satisfied, or not. For example, when an execution switch for the lane keeping control not shown is pressed, it is determined that the condition for the monitoring start is satisfied. If an affirmative determination is made in Step 105, the process proceeds to Step 110, and if a negative determination is made, the process in Step 105 is repeated.

In Step 110, it is determined whether the control start requirement of the lane keep is satisfied, or not. Specifically, it is determined whether the vehicle is in a state of departing from the traveling lane, or not. The situation in which the vehicle deviates from the traveling lane means a situation in which a guide line (a guideline) such as a lane line drawn along both sides or one side of the traveling lane is already being stepped on, or a situation in which the vehicle moves on the guide line. In this situation, it is assumed that the vehicle deviates from the driving lane. Whether the vehicle is in such a situation, or not, can be determined by analyzing the imaging data of the on-board camera 10 and using a well-known method. If an affirmative determination is made in Step 110, the process proceeds to Step 115. On the other hand, if a negative determination is made in Step 110, since there is no need to perform the brake control and the steering control by the lane keeping control, the processing of Step 110 is repeated without proceeding to Step 115 and the following steps.

The guide line referred to here is a boundary line (center line) drawn between the traveling lane of the host vehicle and the opposing lane, a lane boundary line drawn between a plurality of lanes in the same direction, a roadway outside line dividing the traveling lane and the outside of the road (sidewalk etc.), and the like.

In Step 115, it is determined whether any wheel is on the lane line (guide line), or not. The determination is also performed by analyzing the imaging data of the on-board camera 10. If an affirmative decision is made in this case, the process proceeds to Step 120, where a control is performed assuming that the road surface μ is different between the wheel side stepping on the lane line and the opposite wheel side as the lane line determination. That is, the road surface μ of the lane line is lower than the road surface μ of the portion different from the lane line. For that reason, the control is optimized so as to perform the control corresponding to the low μ road surface on the wheel side stepping on the lane line, and the control when the road surface μ is the reference value on the wheel side not stepping on the lane line.

Specifically, a moment is generated in a direction to return the vehicle that has moved to the lane line to the inside of the traveling lane (inside the lane line). For example, in a situation where the vehicle is stepping on the lane line on the left side in the traveling direction, a moment for moving the vehicle to a right direction is generated. In that case, the brake control is performed such that the braking force on a right side in the traveling direction is higher than that a left side, or the steering control is performed such that the steering force for directing the vehicle to the right direction is generated. At that time, since the road surface μ of the right wheel side and the left wheel side of the vehicle are different from each other, if a normal brake control or steering control to be executed when the road surface μ is the reference value is performed, slip may occur on the left wheel side. Therefore, in that case, the control amount in the case of executing at least one of the controlled variables of the brake control and the steering control is set to be smaller than the controlled variables of the normal brake control and steering control to be executed when the road surface μ is the reference value. The controlled variable of the wheel on the high μ road surface side may be set to be small in correspondence with the wheel on the low μ road side. Accordingly, it is preferable that the slip of the wheel 3 is suppressed so as to gradually return the vehicle into the traveling lane.

On the other hand, if a negative determination is made in Step 115, the process proceeds to Step 125, where it is determined whether the road surface condition is a smooth road such as a dry road surface and an asphalt road surface, or not. The determination is made based on the road surface condition data sent from the tire-side device 1. If an affirmative determination is made in this case, the process proceeds to Step 130, where it is determined whether there is a difference in the road surface μ of the four wheels 3a to 3d, or not. The determination is also made based on the road surface condition data sent from the tire-side device 1. For example, when a difference between the highest value of the road surface μ and the lowest value among the road surfaces μ of the four wheels 3a to 3d exceeds a predetermined threshold, an affirmative determination is made. Alternatively, an average value of the road surfaces μ of the four wheels 3a to 3d is calculated, and a difference between the average value and the road surface μ of each of the wheels 3a to 3d is calculated. If the difference exceeds a predetermined threshold value, an affirmative determination may be made.

If an affirmative determination is made in this case, since there is a difference between the road surface μ of the four wheels 3a to 3d and a vehicle attitude can become unstable, the process proceeds to Step 135, where the lane keeping control is stopped, or the controlled variable of the brake control and the steering control for the lane keeping control is optimized. In other words, the control corresponding to the road surface μ of each of the wheels 3a to 3d is performed in response to the case of the μ split road where there is a difference in the road surface μ between the right and left wheels of the vehicle or the case where the road surface μ of only one wheel is different from the road surfaces μ of the other wheels. For example, in the μ split road, since slip is likely to occur on the low μ road surface side, the control is optimized so as to perform the control corresponding to the low μ road surface on the wheel side on the low μ road surface and the control corresponding to the high μ road surface on the wheel side on the high μ road surface, as with the control on the lane line.

When a moment for moving the vehicle in a leftward direction or a rightward direction is generated, basically, it is sufficient to generate a braking force on the wheel on the moving direction side. However, the stability of the vehicle is improved by generating the braking force on both of the left and right sides rather than generating the braking force on only one of the left and right sides of the vehicle. For that reason, it is preferable to generate a moment for moving the vehicle in the leftward direction or the rightward direction by generating a difference in the braking force of each wheel while generating a braking force between the wheels in a diagonal relationship. Similarly, it is needless to say that in this case, if the road surface µ differs between the right and left wheels, the control corresponding to the road surface µ can be performed to optimize the control.

On the other hand, if a negative determination is made in Step 130, the process proceeds to Step 140 and it is determined whether the road surface is a high µ road surface higher in the road surface µ than the reference value. The determination is also made based on the road surface condition data sent from the tire-side device 1. In the case of the high µ road surface, even if the controlled variable of the brake control or the steering control is increased, it is difficult for the wheel to slip and the possibility of impairing the stability of the vehicle is low. Therefore, if an affirmative determination is made in this case, the process proceeds to Step 145, where the controlled variable for the brake control or the steering control is set to be larger than that in the case where the road surface µ is the reference value as the control corresponding to the high µ road surface, to execute the lane keeping control. As a result, the vehicle can be returned to the traveling lane with a higher response.

Further, if a negative determination is made in Step 140, the process proceeds to Step 150 and it is determined whether the road surface is the low µ road surface lower in the road surface µ than the reference value, or not. The determination is also made based on the road surface condition data sent from the tire-side device 1.

When the road surface µ is the reference value, the normal lane keeping control may be executed. Therefore, if the negative determination is made in Step 150, the process proceeds to Step 155, where the brake control and the steering control in normal lane keeping control are executed. In the case of the low road surface, an affirmative determination is made in Step 150. In the case of the low µ road surface, if the controlled variable of the brake control or the steering control is generated in the same manner as the reference value, there is a possibility that the wheel may slip and the stability of the vehicle may be impaired. Therefore, if the determination in Step 150 is affirmative, the process proceeds to Step 160 to stop the lane keeping control, or to set the controlled variable of the brake control or the steering control to be smaller than that when the road surface µ is the reference value for optimizing the controlled variable, as the control corresponding to the low µ road surface. This makes it possible to return the vehicle to the traveling lane with higher stability. Further, when the controlled variable of the brake control or the steering control is reduced as described above, the response delay can be suppressed by setting a timing of the control intervention earlier than that in the case where the road surface µ is the reference value.

Further, in the case of the low µ road surface, a warning may be given to the driver so as to alert the driver so that the driver does not steer or performs gentle steering operation matching the low µ road surface.

Further, when the negative determination is made in the above-described Step 125, the control in the case where the road surface is not a smooth road is performed. First, in Step 165, it is determined whether a cat's eye (protruding road stud) exists on the traveling road surface, or not, specifically whether any wheel has stepped on the cat's eye, or not. The determination can be made based on the analysis of the imaging data of the on-board camera 10 or the road surface condition data sent from the tire-side device 1. If an affirmative determination is made in this case, the process proceeds to Step 170 and the lane keeping control for avoiding the cat's eye is executed.

When any wheel has stepped on the cat's eye, since there is a possibility that the vehicle posture becomes unstable and there is a possibility that the tire may be damaged, it is desirable to return the vehicle to the traveling lane more quickly. Therefore, when the wheels stepped on the cat's eye, by generating the maximum value of the control amount of the controllable brake control and the steering control in the detected road surface µ, the moment in the direction to return the vehicle to the traveling lane is generated more. As a result, the vehicle can be returned to the traveling lane more quickly, stabilization of the vehicle posture can be achieved, and damage to the tire can be reduced.

On the other hand, if a negative determination is made in Step 165, the process proceeds to Step 175, and a control corresponding to unpaved roads, snowy road surfaces, and the like is performed. In other words, since the wheels tend to slip easily like the low µ road surface, the lane keeping control is stopped, or the controlled variable of the brake control and the steering control for the lane keeping control is optimized. For example, the controlled variable of the brake control or the steering control is set to be smaller than that when the road surface µ is the reference value for optimization. This makes it possible to return the vehicle to the traveling lane with higher stability. Further, when the controlled variable of the brake control or the steering control is reduced as described above, the response delay can be suppressed by setting a timing of the control intervention earlier than that in the case where the road surface µ is the reference value.

As described above, in the present embodiment, the road-surface-condition estimation device is configured by the tire-side device 1 and the vehicle-side device 2 so as to grasp the road surface condition based on the road surface condition data transmitted from the tire-side device 1. Therefore, the road surface condition or the road surface µ of the traveling road surface of the vehicle can be accurately detected, and a more accurate lane keeping control can be performed according to the detection result.

In particular, since the tire-side device 1 estimates the road surface condition by detecting the vibration of a ground contact surface of the tire, the road surface condition can be estimated more accurately. Therefore, the more accurate lane keeping control can be performed. Further, the tire-side device 1 and the vehicle-side device 2 configuring such a road-surface-condition estimation device can be used in common with, for example, a device provided in a tire pressure monitoring system for detecting the tire air pressure based on a ground contact length of the tire. The number of components can be reduced. Therefore, the costs can be reduced.

Other Embodiments

The present disclosure is not limited to the above embodiment and can appropriately be modified.

For example, in each of the above-described embodiments, an example of the lane keeping control corresponding to the road surface condition and the road surface μ is cited, but the lane keeping control may be performed by a method other than the above-described method. In other words, if the road surface condition and the road surface μ are grasped by the road-surface-condition estimation device configured by the tire-side device 1 and the vehicle-side device 2, and if the lane keeping control is performed based on the grasped result, more accurate lane keeping control can be performed even if what kind of technique is used.

In addition, the road surface condition data is provided to a communication center and the data is provided to the other vehicles passing through the same traveling lane as the subject vehicle from the communication center. As a result, the provided data can be used as the road surface condition data when the other vehicles perform the lane keeping control. For example, when the road surface condition data sent from the tire-side device 1 is transmitted to the vehicle-side device 2, the road surface condition data is transmitted to the communication center through a wireless network of cellular phones such as a DCM (Data Communication Module). Then, the communication center transmits the road surface condition data to the other vehicle through the DCM. The transmitted data can be transmitted to the lane keeping ECU through the in-vehicle LAN for CAN communication of the other vehicles and used for the lane keeping control.

In the above-described embodiments, the case where the lane keeping ECU 4, the brake ECU 5, and the EPS-ECU 6 are configured by separate ECUs has been described, but any two or all of those ECUs may be configured as an integrated ECU.

Furthermore, in the above embodiments, the road surface condition is estimated in the tire-side device 1, and the road surface condition data indicating the road surface condition is transmitted to the vehicle-side device 2. However, this configuration also shows an example. For example, vibration data generated by the tire-side device 1 as the road surface condition data may be transmitted to the vehicle-side device 2, and the road surface condition may be estimated on the basis of the vibration data by the vehicle-side device 2.

What is claimed is:

1. A lane keeping control system comprising:
   a road-surface-condition estimation device including:
      a tire-side device having a vibration detection unit that is attached to a rear surface of a tread of a tire provided on each of wheels in a vehicle and outputs a detection signal corresponding to a magnitude of vibration of the tire,
      a signal processing unit that performs a signal processing on the detection signal of the vibration detection unit to generate road surface condition data that is data indicative of a road surface condition of a traveling road surface of the tire, and
      a transmitter that transmits the road surface condition data, and
      a vehicle-side device having a receiver that receives the road surface condition data transmitted from the transmitter, an information processing unit that recognizes the road surface condition of the traveling road surface of each wheel from the road surface condition data and generates data indicative of the recognition result, and an output unit that outputs the data generated by the signal processing unit;
   a lane keeping control device that executes a lane keeping control that restrains the vehicle from deviating from the traveling lane based on the road surface condition estimated by the road-surface-condition estimation device;
   a brake control device that executes a brake control for controlling a braking force generated to any one of the wheels as the lane keeping control; and
   a steering control device that executes a steering control for adjusting a steering angle of the wheel as the lane keeping control, wherein
   at least one of a controlled variable of the brake control in the brake control device and a controlled variable of the steering control in the steering control device is controlled based on the road surface condition detected by the road-surface-condition estimation device,
   the lane keeping control system further comprises a determination device for determining whether a projecting road stud is present on the traveling road surface, or not,
   the road-surface-condition estimation device detects a road surface friction coefficient as the road surface condition, and
   when the road stud is present, controllable maximum values of the controlled variables of the brake control and the steering control in the detected road surface friction coefficient are generated.

2. The lane keeping control system according to claim 1, wherein
   the road-surface-condition estimation device detects a road surface friction coefficient as the road surface condition, and
   when the road surface friction coefficient of each of the wheels is a high p road surface larger than a predetermined reference value, at least one of the controlled variable of the brake control in the brake control device and the controlled variable of the steering control in the steering control device is set to be larger than that when the road surface friction coefficient is the reference value.

3. The lane keeping control system according to claim 1, wherein
   the road-surface-condition estimation device detects a road surface friction coefficient as the road surface condition, and
   when the road surface friction coefficient of each of the wheels is a low p road surface smaller than a predetermined reference value, the lane keeping control is stopped, or at least one of the controlled variable of the brake control in the brake control device and the controlled variable of the steering control in the steering control device is set to be smaller than that when the road surface friction coefficient is the reference value.

4. The lane keeping control system according to claim 1, wherein
   the road-surface-condition estimation device detects a road surface friction coefficient as the road surface condition, and
   when there is a difference in the road surface friction coefficient of the respective wheels, the lane keeping control is stopped, or at least one of the controlled variable of the brake control in the brake control device and the controlled variable of the steering control in the steering control device for at least the wheel smaller in the road surface friction coefficient is set to be smaller than that when the road surface friction coefficient is the reference value.

5. The lane keeping control system according to claim 1, wherein
   the road-surface-condition estimation device determines whether the road surface condition is a smooth road, an unpaved road, or a snowy road, and when the road surface condition is the unpaved road or the snowy road, the lane keeping control is stopped, or at least one of the controlled variable of the brake control in the brake control device and the controlled variable of the steering control in the steering control device is set to be smaller than that when the road surface friction coefficient is the reference value.

6. A lane keeping control system comprising:
a road-surface-condition estimation device including:
  a tire-side device having a vibration detection unit that is attached to a rear surface of a tread of a tire provided on each of wheels in a vehicle and outputs a detection signal corresponding to a magnitude of vibration of the tire;
  a signal processing unit that performs signal processing on the detection signal of the vibration detection unit to generate road surface condition data that is data indicative of a road surface condition of a traveling road surface of the tire,
  a transmitter that transmits the road surface condition data, and
  a vehicle-side device having a receiver that receives the road surface condition data transmitted from the transmitter, an information processing unit that recognizes the road surface condition of the traveling road surface of each wheel from the road surface condition data and generates data indicative of the recognition result, and an output unit that outputs the data generated by the signal processing unit;
a lane keeping control device that executes a lane keeping control that restrains the vehicle from deviating from the traveling lane based on the road surface condition estimated by the road-surface-condition estimation device;
a brake control device that executes a brake control for controlling a braking force generated to any one of the wheels as the lane keeping control; and
a steering control device that executes a steering control for adjusting a steering angle of the wheel as the lane keeping control, wherein
at least one of a controlled variable of the brake control in the brake control device and a controlled variable of the steering control in the steering control device is controlled based on the road surface condition detected by the road-surface-condition estimation device, and
the lane keeping control system further comprises a recognition device for recognizing a guide line drawn along the traveling lane, wherein
when any one of the wheels is on the guide line, at least one of the controlled variable of the brake control in the brake control device and the controlled variable of the steering control in the steering control device is set to be smaller than that when the road surface friction coefficient is the reference value.

* * * * *